(12) United States Patent
Ginty et al.

(10) Patent No.: US 12,405,732 B1
(45) Date of Patent: Sep. 2, 2025

(54) UNPOWER DATA RETENTION FOR SOLID STATE DRIVES

(71) Applicant: Dell Products L.P., Round Rock, TX (US)

(72) Inventors: Anthony Ginty, Douglas (IE); Colm Murphy, Cork (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/650,313

(22) Filed: Apr. 30, 2024

(51) Int. Cl.
*G06F 12/00* (2006.01)
*G06F 3/06* (2006.01)

(52) U.S. Cl.
CPC .......... *G06F 3/0619* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 12,265,732 B1 * | 4/2025 | Chittilappilly | G06F 3/0658 |
| 2016/0342347 A1 * | 11/2016 | Duzly | G06F 3/065 |
| 2022/0342819 A1 * | 10/2022 | Reina | G11C 5/148 |

* cited by examiner

*Primary Examiner* — Daniel D Tsui
(74) *Attorney, Agent, or Firm* — WOMBLE BOND DICKINSON (US) LLP (57) ABSTRACT

Methods and systems for storing data are disclosed. Data may be stored in persistent storage of storage devices. When a storage device is likely to become depowered, an expedited data refresh procedure may be performed. The expedited refresh procedures may improve the likelihood that the data is able to be retrieved from the persistent storage after the storage device is repowered. The expedite refresh procedures may be prioritized to complete the procedures prior to the storage devices being depowered.

20 Claims, 6 Drawing Sheets

UNPOWER DATA RETENTION FOR SOLID STATE DRIVES

FIELD

Embodiments disclosed herein relate generally to device management. More particularly, embodiments disclosed herein relate to systems and methods to onboard devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services. To provide the computer implemented services, various endpoint devices may perform various actions and communicate with one another. To do so, data may be generated, used, and stored for future use.

Storage devices may be used to store the data for future use. During operation, the storage devices may consume power. If power become unavailable, then the storage devices may be at risk of losing data (e.g., the storage media in which the data is encoded may only be able to store data for a finite amount of time when not powered).

To reduce the likelihood of data being lost, the storage devices may be proactively managed by expediting data refresh procedures prior to when the storage devices are depowered. During the expedite data refresh procedures, data from storage cells may be migrated. Doing so may increase the time that the storage medium is likely to retain the data while unpowered to a maximum duration. Consequently, data loss may be less likely to occur.

By doing so, endpoint devices may be less likely to suffer data losses due to losses of power. Thus, embodiments disclosed here may address, in addition to others, the technical problem of data loss through proactive management.

In an embodiment, a method of managing operation of a data processing system is provided. The method may include identifying a period of time when the data processing system will be depowered for a duration of time meeting criteria; based on the identified period of time: issuing an expedited data refresh command to a storage device of the data processing system prior to the period of time; and, based on the issued expedited data refresh command, performing, the storage device, an expedite refresh of data stored in the storage device to obtain an updated storage device prior to the period of time.

The expedited refresh command may indicate that the data stored in the storage device is to be refreshed and the storage device is to shut down once the data is refreshed.

The storage device may be a solid state based storage device, and the duration of time is based on a solid state storage architecture used by the solid state based storage device.

The solid state storage architecture may include a component (e.g., topology of the cell, parts of the cell) that limits the duration of time that data stored in the storage device while the storage device is depowered is likely to be retrievable after the storage device is repowered after being depowered.

The expedited refresh may be performed by the storage device using a foreground process that is not deprioritized with respect to host originated storage commands issued to the storage device.

The storage device may be adapted to perform a continuous refresh process for the data, the continuous refresh process being a background process that is deprioritized with respect to host originated storage commands issued to the storage device.

The data may be stored in cells of the storage device, the cells being adapted to maintain data stored in the cells indefinitely while the storage devices is powered and maintain the data stored in the cells for a period of time while the storage device is depowered.

The expedited refresh and the continuous refresh process may migrate the data between the cells, and the period of time being based on a cell architecture of the cells.

In an embodiment, a non-transitory storage is provided that includes instructions that when executed cause the method, as discussed above, to be provided.

In an embodiment, a data processing system that performs the method as discussed above is provided.

Figure 1A:
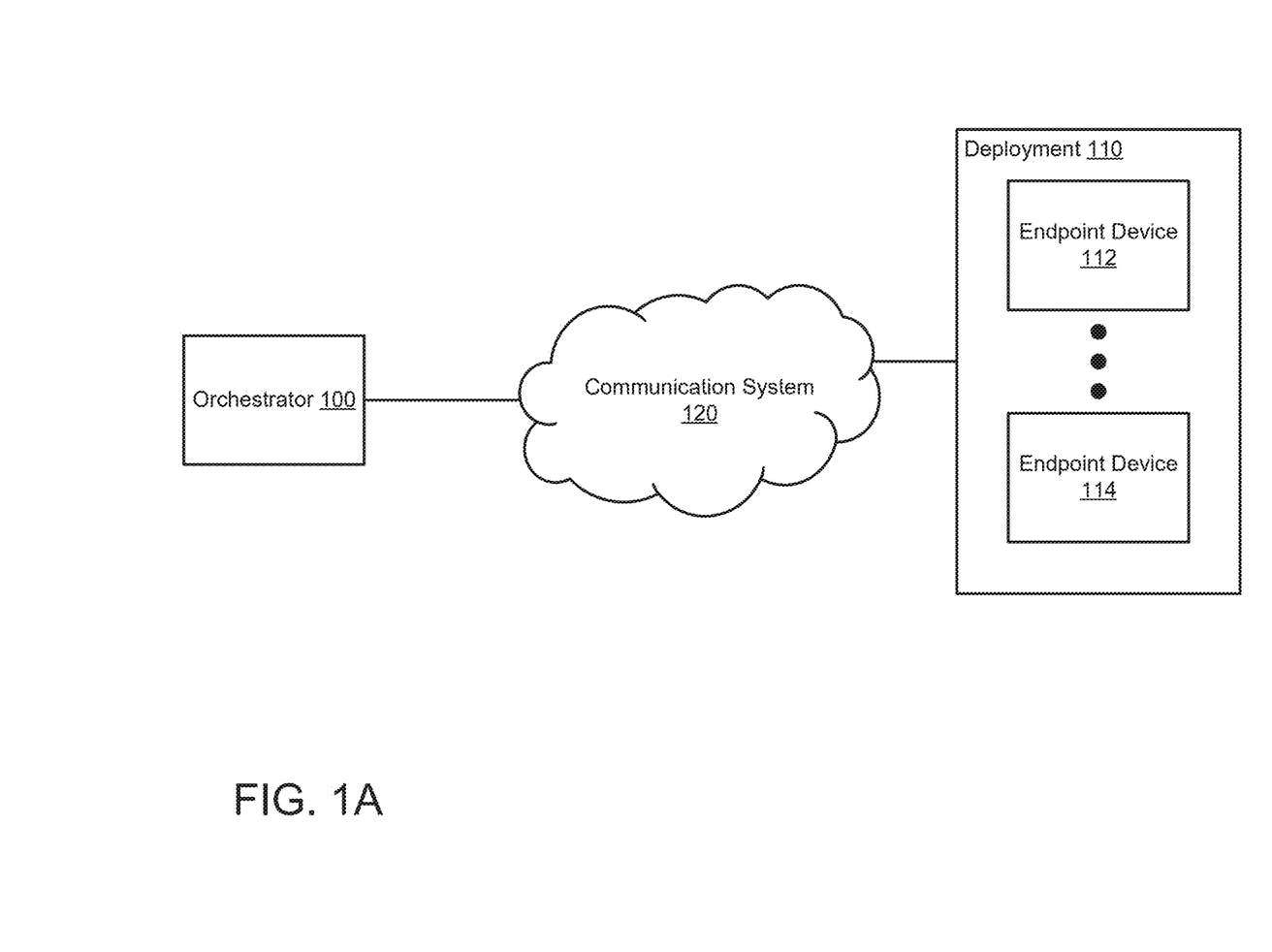
FIGS. 1A-1C show block diagrams illustrating a system in accordance with an embodiment.

Turning to FIG. 1A, a block diagram illustrating a system in accordance with an embodiment is shown. The system shown in FIG. 1A may provide computer-implemented services. The computer implemented services may include any type and quantity of computer implemented services. For example, the computer implemented services may include data storage services, instant messaging services, database services, transaction processing services, and/or any other type of service that may be implemented with a computing device.

To provide the computer implemented services, the system may include various distributed components. The components may cooperate to provide the computer implemented services.

During operation of the distributed components, any of the components may generate, send, and/or otherwise utilize information. However, if access to the information is lost, then the distributed components may not be able to operate as desired, and may prevent computer implemented services from being provided and/or may impair the provisioning of the computer implemented services.

For example, consider a scenario where a computer implemented services that is being provided is a database service. To provide such services, information may be stored and provided over time. To store the information, the information may be encoded as data on one or more storage devices.

However, if the storage devices do not properly store the data, lose access to the data, and/or the data becomes inaccessible for other reasons, then access to the encoded information may be lost. For example, if a storage device is instructed to but fails to store data over a duration of time, then the information may become inaccessible. Inaccessibility of the information may prevent the database services from being provided as desired/expected (e.g., may not be able to provide information previously believed to be retrievable in the future).

In general, embodiments disclosed herein may provide methods, systems, and/or devices for managing the operation of distributed systems to provide computer implemented services. To manage the distributed system, storage devices of the distributed system may perform procedures to improve the likelihood of stored data being accessible in the future. The procedures may be performed, for example, when a storage device is likely to be depowered for a duration of time. The procedures may be performed in advance of the depowering so that information stored in the storage device is less likely to become inaccessible while the storage device is depowered.

For example, data stored in solid state storage may become in accessible over time by virtue of the fundamental operation of the storage medium (e.g., solid state storage sales may only store data for certain periods of time). If data is stored in a solid state storage device for a duration of time (e.g., approaching the normal maximum storage duration of the solid state storage device), and then the solid state storage device is depowered for a second duration of time, the combined durations of time may prevent continuous procedures that otherwise maintain the data from being performed. For example, the continuous procedures may include migrating data between cells of a storage device over time. If such procedures are not performed prior to powering down of the storage device, then the cells may lose the ability to read the data while depowered.

To improve the likelihood of data being accessible after a storage device is depowered, the duration of time for the depowering as well as the duration of time since continuous maintenance procedures were performed to estimate a maximum duration of time that data is likely to be successfully retained without performance of additional maintenance procedures. If the duration of the depowering and time since a last performed maintenance exceeds the likely duration of time that data is likely to be successfully retained without maintenance, then expediated maintenance procedures may be performed prior to shut down of the storage devices.

By doing so, embodiments disclosed herein may provide data processing systems that are less likely to suffer data loss. Consequently, the data processing systems may be more likely to be able to provide desired computer implemented services over longer durations of time.

To provide the above noted functionality, the system of FIG. 1A may include orchestrator 100, deployment 110, and communication system 120. Each of these components is discussed below.

Deployment 110 may provide desired computer implemented services. To do so, deployment 110 may include any number of endpoint devices (e.g., 112-114) that may cooperatively and/or independently provide the computer implemented services. The endpoint devices may host various software (e.g., executing applications) that may generate, transmit, and/or otherwise utilize data in their operation. To reduce the likelihood of the endpoint devices from being unable to provide the computer implemented services (e.g., due to lack of access to data due to data storage device failures), the endpoint devices may include data storage devices that may perform expedited data refresh procedures prior to being powered down. Refer to FIGS. 1B-2B for additional details regarding storage devices.

Orchestrator 100 may manage operation of deployment 110. To do so, orchestrator 100 may provide data to and use data provided by endpoint devices 112-114. Thus, if endpoint devices 112-114 are unable to use or provide data to orchestrator 100 due to, for example, data loss, then orchestrator 100 may also be unable to provide all, or a portion, of its functionality.

To manage endpoint devices 112-114, orchestrator 100 may provide information regarding upcoming events, such as periods of time when deployment 110 is expected to be depowered. Endpoint devices 112-114 may use such information, for example, to schedule expedited data refreshes prior to the periods of time in which they will be depowered. Consequently, the data processing systems may be less likely to lose access to previously stored information by virtue of the depowering of the endpoint devices.

Figure 2A:
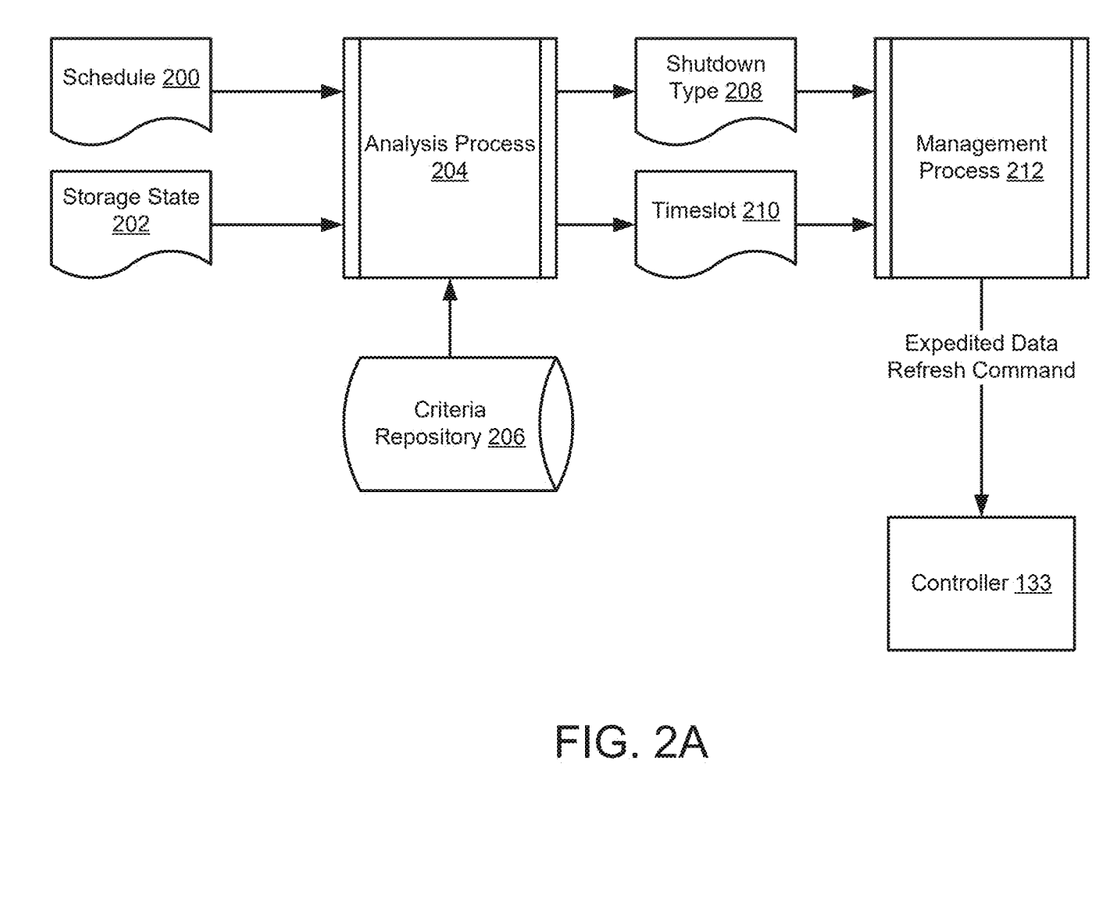
FIGS. 2A-2B show data flow diagrams in accordance with an embodiment.
Figure 2B:
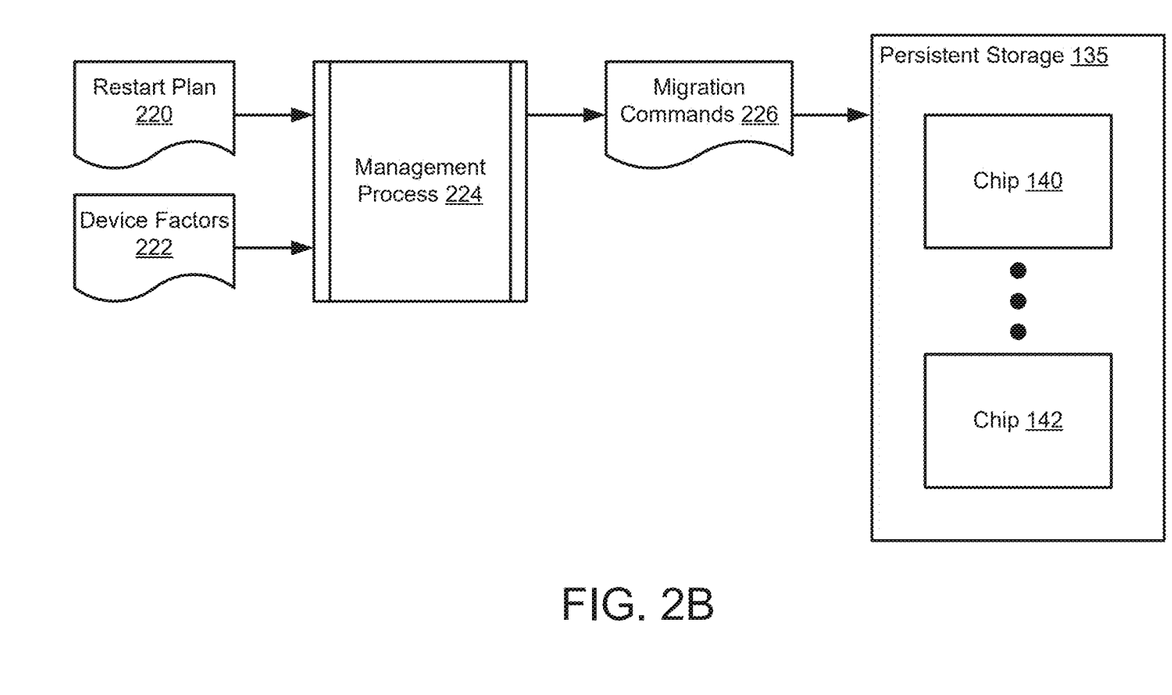
Figure 3:
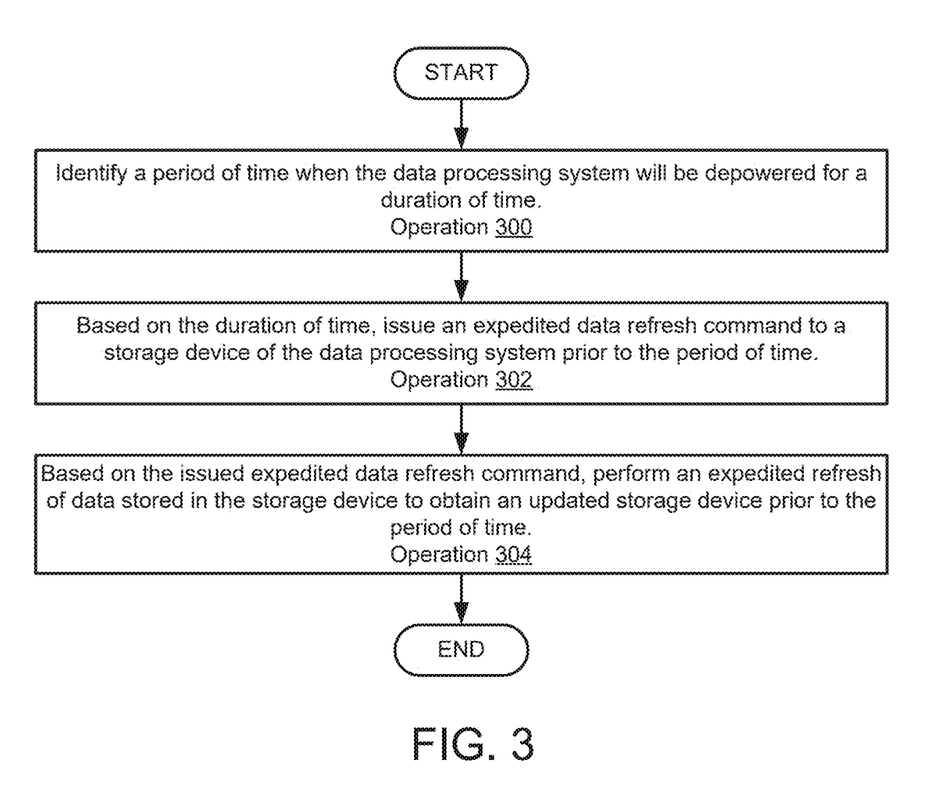
FIG. 3 shows a flow diagram illustrating a method in accordance with an embodiment.

When providing their functionality, any of (and/or components thereof) orchestrator 100 and deployment 110 may perform all, or a portion, of the actions and methods illustrated in FIGS. 2A-3.

Any of (and/or components thereof) orchestrator 100 and deployment 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1A as including a limited number of specific components, a system in accordance with an embodiment may include fewer, additional, and/or different components than those illustrated therein.

Figure 1B:
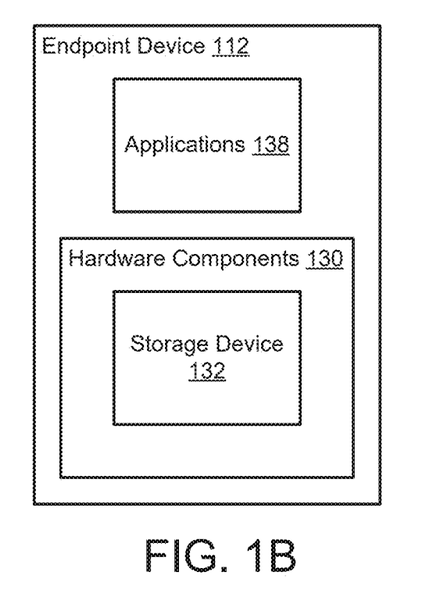

Turning to FIG. 1B, a diagram of endpoint device 112 in accordance with an embodiment is shown. Any of the endpoint devices of the system of FIG. 1A may be similar to endpoint device 112.

To provide desired computer implemented services, endpoint device 112 may include any type and quantity of hardware components 130 (e.g., processors, memory modules, etc.). Hardware components 130 may support execution of various applications 138 which may provide the computer implemented services.

Figure 4:
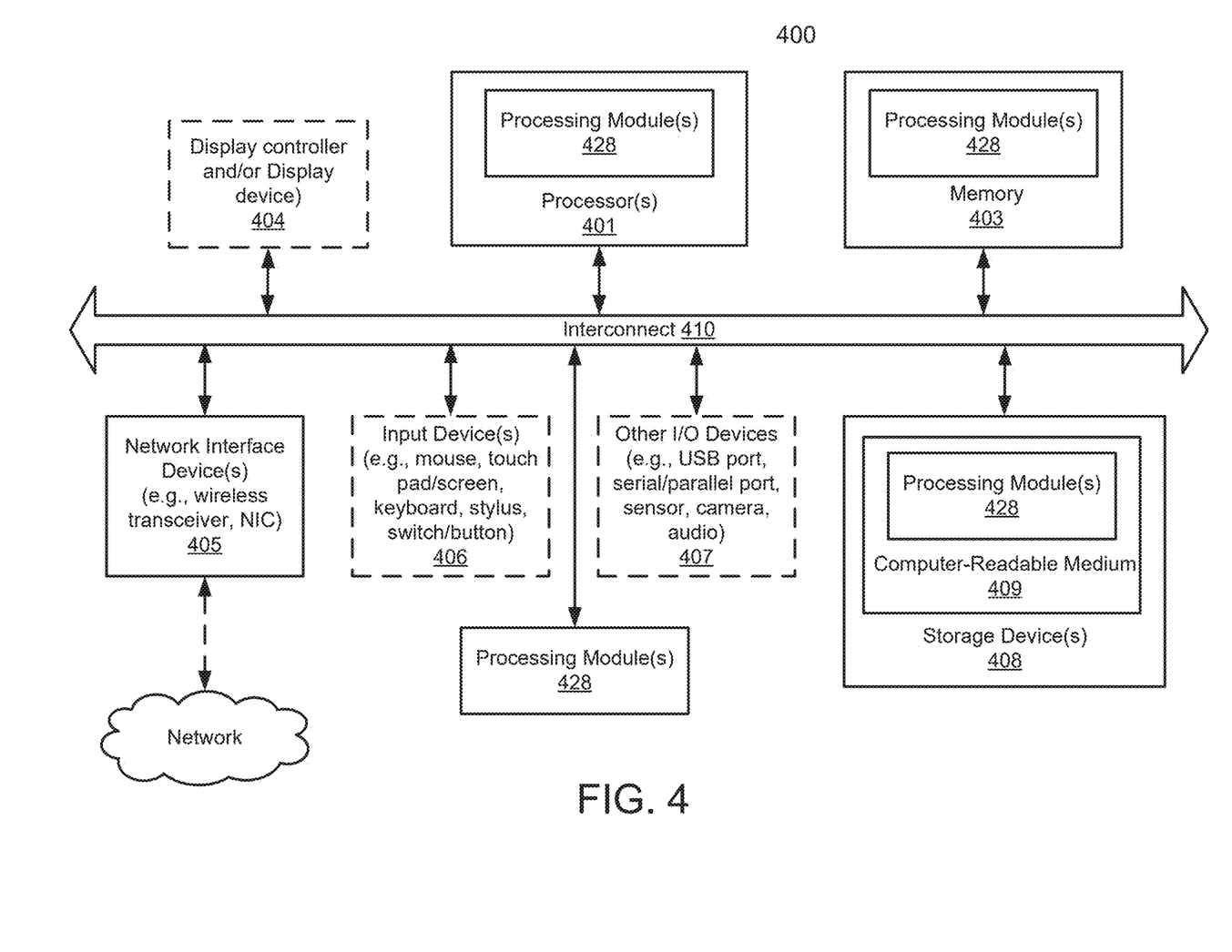
FIG. 4 shows a block diagram illustrating a data processing system in accordance with an embodiment.

Hardware components 130 may include storage device 132. Storage device 132 may be implemented using, for example, a solid state storage device. If storage device 132 fails to store data on behalf of applications 138 (e.g., as requested), then the data expected to be accessible by applications 138 in the future may be inaccessible. Consequently, operation of applications 138 may be impaired (e.g., may fail to operate, may operate in less desired manners, etc.). Endpoint device 112 may be implemented using a data processing system. Refer to FIG. 4 for additional details regarding data processing systems.

Figure 1C:
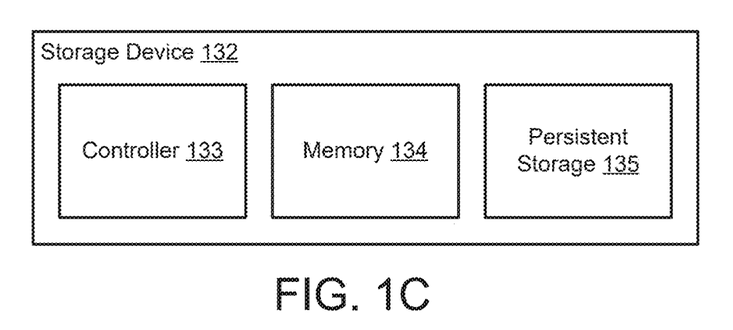

Turning to FIG. 1C, a diagram of storage device 132 in accordance with an embodiment is shown. To facilitate storage of data, storage device may include controller 133, memory 134, and persistent storage 135. Each of these components is discussed below.

Controller 133 may manage storage of data in storage device 132. For example, controller 133 may obtain read/write/deletion requests from a host system, and update information in persistent storage 135 (e.g., solid state storage media) based on the obtained commands from the host system.

Additionally, controller 133 may perform continuous and expedited data refreshes. The continuously performed data refreshes may be performed by periodically migrating data between cells of persistent storage 135. In contrast, the expedited data refreshes may be performed, for example, based on policies (e.g., may indicate when they should be performed based on when the host system will be shut down), based on instructions from the host system (e.g., a communication protocol may include a special command to initiate performance of an expedited refresh), and/or via other methods.

During the expedited data refresh, the data stored in persistent storage 135 may be migrated between cells of the solid state storage medium. Migrating the data may cause the data to be newly written to cells of persistent storage 135. The cells of persistent storage 135 may have a finite capacity for storing the data in each cell (e.g., may be lost if not migrated within predetermined period of time). In other words, when data is stored in persistent storage 135, a metaphorical clock may start with the longer the data being stored in the cell the higher likelihood of the data become unreadable by virtue of the cell architecture. Thus, when data a newly written or migrated, the data may be likely to remain accessible for a maximum duration of time.

Memory 134 may be transitory storage used by controller 133. For example, when commands and/or data from a host system is received, the commands and/or data may be temporarily stored in memory 134 until used to update data stored in persistent storage 135.

Persistent storage 135 may include any amount of persistent storage (e.g., such as solid state based data storage chips). Persistent storage 135 may include a more limited access speed when compared to memory 134. Thus, data may be staged with memory 134 until persistent storage 135 is able to store the data. Persistent storage 135 may include any number of solid state storage cells (e.g., storage locations in NAND or other types of chips).

Refer to FIGS. 2A-2B for additional details regarding management of data stored in storage device 132.

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 200, 202, etc.) is used to represent data structures, a second set of shapes (e.g., 204, 212, etc.) is used to represent processes performed using and/or that generate data, and a third set of shapes (e.g., 206, etc.) is used to represent large scale data structures such as databases.

Turning to FIG. 2A, a first data flow diagram in accordance with an embodiment is shown. The first data flow diagram may illustrate data used in and data processing performed in managing data stored in storage devices.

To manage the data stored in the storage devices, analysis process 204 may be performed. During analysis process 204, information regarding durations of time when an endpoint device is likely to be unpowered and the states of storages of the endpoint device may be analyzed with respect to the likelihood of data loss occurring.

For example, schedule 200 may include any type and quantity of information regarding scheduled periods of time when the endpoint device is likely to be depowered. Scheduled 200 may be defined, for example, by an orchestrator that manages operation of the endpoint devices. Additionally, storage state 202 may include any type and quantity of information regarding the state of stored data in the storage devices of the endpoint devices. Storage state 202 may indicate when various cells of the storage device were last refreshed, the type of the cell (e.g., cell architecture), and/or may include other information regarding the stored data and storage media which hosts the stored data.

In addition to these portions of data, information from criteria repository 206 may be taken into account when analyzing the risk of data loss due to depowering of the endpoint device. Criteria repository 206 may include, for example, information regarding how to compute likelihood of data loss based on the information (e.g., 200, 202) about the endpoint device, thresholds or other information that indicate whether estimated levels of risk exceed acceptable levels, etc.

The aforementioned information may be used to (i) estimate the risk level for data loss, and (ii) when sufficiently high, schedule performance of shutdowns that include expediated data refreshes as part of the shutdown.

For example, when the level of risk is too high, analysis process 204 may output a shutdown type (e.g., 208) that includes the expedited data refresh. Additionally, a timeslot (e.g., 210) for performing the refresh may be output (e.g., so that the refresh is performed ahead of the shutdown).

Once obtained, shutdown type 208 and timeslot 210 may be used in management process 212. During management process 212, a shutdown of the type specified by shutdown type 208 may be scheduled and/or initiated at a time based on timeslot 210.

To initiate the shutdown, a command to a corresponding storage device may be generated and sent to the storage device. The command may indicate any of (i) that a shutdown is going to occur at a particular time, (ii) that a restart of the shutdown type 208 is to be performed, (iii) a priority of the shutdown (e.g., may indicate whether a foreground process must be performed or a background process may be performed), and (iv) the shutdown should be performed during timeslot 210. The command may be formatted in accordance with a communication protocol used by the host system to cooperate with the storage device. For example, the command may be formatted and sent to a local controller (e.g., 133) of the storage devices. The command may include a restart plan for the storage device.

By doing so, the storage device may automatically initiate performance of an expedite data refresh as part of a shut down. When so performed, performing the data refresh may be prioritized over servicing other commands (e.g., read, write, delete, etc.) from the host endpoint device to reduce the likelihood of data loss occurring after storage device is depowered.

Turning to FIG. 2B, a second data flow diagram in accordance with an embodiment is shown. The second data flow diagram may illustrate data used in and data processing performed in processing storage commands.

To process storage comments, management process 224 may be performed. During management process 224, information such as restart plan 220 may be obtained from the communications. Restart plan 220 may include information regarding types of shutdowns to be performed by the storage device. For example, restart plan 220 may indicate that a shut down with an expedite data refresh is to be performed.

To decide when to perform the shutdown as indicated by restart plan 220, additional information may be taken into account. For example, device factors 222 may be used to make the decision. Device factors 222 may include information regarding the storage device include, for example, (i) the amount of data to be refreshed, (ii) the quantity of storage cells, (iii) estimated durations of time for performing a migration from one cell to another, (iv) estimated other types of work that may need to be performed and scheduled around, and/or other factors regarding the condition of the storage device.

Using device factors 222, management process 224 may identify and schedule performance of any number of migration commands 226. Each of migration commands 226 may indicate migration of portions of data stored in persistent storage 135 between cells at various points in time. The particular cells and times may be selected to ensure completion of migration of all the data stored in persistent storage 135 between cells.

In an embodiment, management process 224 may also take into account various policies. The policies may classify different portions of data stored in persistent storage 135 with respect to various factors. Management process 224 may take these factors into account when establishing migration commands 226. For example, the policies may ascribe different levels of importance to different portions of data. The different level of importance may be used, for example, to exclude some data from being migrated (e.g., less important data that may have reduced impact on a host endpoint device if lost). The data in persistent storage 135 may be classified by the policies based on any schema.

Once obtained, migration commands 226 may be send to persistent storage 135. For example, persistent storage 135 may include any number of solid state storage chips (e.g., 140-142) having cells in which portions of data are stored.

Migration commands 226 may cause the chips to perform various operations. The operations may cause the data to be migrated between cells (e.g., the cells may be on similar or different chips).

Once complete, the storage device may depower itself until it is repowered at a later point in time.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, using the data flows shown in FIGS. 2A-2B, an endpoint device in accordance with an embodiment may be more likely to be able to provide desired computer implemented services by improving the likelihood of previously stored data being available after the endpoint device is repowered.

As discussed above, the components of FIG. 1A may perform various methods to manage operation of a data processing system (e.g., an endpoint device). FIG. 3 illustrates a method that may be performed by the components of the system of FIGS. 1A-2B. In the diagram discussed below and shown in FIG. 3, any of the operations may be repeated, performed in different orders, and/or performed in parallel with or in a partially overlapping in time manner with other operations.

Prior to operation 300, a data processing system may store data in a storage device for future use.

At operation 300, a period of time when a data processing system will be depowered for a duration of time is identified. The period of time may be identified, for example, by receiving a notification from an orchestrator indicating the period time, by obtaining user feedback, by reading a schedule from storage, and/or via other methods. The period of time may be period of time in the future.

At operation 302, based on the duration of time, an expedited data refresh command is issued to a storage device of the data processing system prior to the period of time. The expedited data refresh command may be issued by sending a particular command to a controller of the storage device. The command may comply with a communication protocol used with respect to the storage device (e.g., NVMe, SATA, etc.).

At operation 304, based on the issued expedited refresh command, an expedite refresh of data stored in the storage device is performed to obtain an updated storage device prior to the period of time. The expedited refresh may be performed by migrating data between storage cells prior to the period of time, and depowering the storage device. All data stored in the storage device may be migrated. A foreground process may be performed to complete the migration. The foreground process may be prioritized over a continuous data refresh process performed by the storage device. The continuous data refresh process may be a background process that is deprioritized with respect to other commands from the host system.

Performing the migration may update the data processing system. Once completed, the updated data processing system may provide computer implemented services.

For example, the data processing system may remain depowered for a duration of time. However, by virtue of the migration of the data, the data may be more likely to be able to be obtained once the data processing system is repowered.

The method may end following operation 304.

Thus using the method illustrated in FIG. 3, embodiments disclosed herein may improve the likelihood of data being retained while host systems are depowered for periods of time.

Any of the components illustrated in FIGS. 1A-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing operation of a data processing system, comprising:
   identifying a period of time when the data processing system will be depowered for a duration of time meeting criteria;
   based on the identified period of time:
      issuing an expedited data refresh command to a storage device of the data processing system prior to the period of time; and
      based on the issued expedited data refresh command, performing, by the storage device, an expedite refresh of data stored in the storage device to obtain an updated storage device prior to the period of time.

2. The method of claim 1, wherein the expedited refresh command indicates that the data stored in the storage device is to be refreshed and the storage device is to shut down once the data is refreshed.

3. The method of claim 1, wherein the storage device is a solid state based storage device, and the duration of time is based on a solid state storage architecture used by the solid state based storage device.

4. The method of claim 3, wherein the solid state storage architecture comprises a component that limits the duration of time that data stored in the storage device while the storage device is depowered is likely to be retrievable after the storage device is repowered after being depowered.

5. The method of claim 1, wherein the expedited refresh is performed by the storage device using a foreground process that is not deprioritized with respect to host originated storage commands issued to the storage device.

6. The method of claim 5, wherein the storage device is adapted to perform a continuous refresh process for the data, the continuous refresh process being a background process that is deprioritized with respect to host originated storage commands issued to the storage device.

7. The method of claim 6, wherein the data is stored in cells of the storage device, the cells being adapted to maintain data stored in the cells indefinitely while the storage devices is powered and maintain the data stored in the cells for a period of time while the storage device is depowered.

8. The method of claim 7, wherein the expedited refresh and the continuous refresh process migrate the data between the cells, and the period of time being based on a cell architecture of the cells.

9. A non-transitory computer readable medium that stores instructions, the instructions causing operations to be performed when the instructions are executed by a processor, and the operations comprising:
   identifying a period of time when a data processing system will be depowered for a duration of time meeting criteria;
   based on the identified period of time:
      issuing an expedited data refresh command to a storage device of the data processing system prior to the period of time; and
      based on the issued expedited data refresh command, performing, by the storage device, an expedite refresh of data stored in the storage device to obtain an updated storage device prior to the period of time.

10. The non-transitory computer readable medium of claim 9, wherein the expedited refresh command indicates that the data stored in the storage device is to be refreshed and the storage device is to shut down once the data is refreshed.

11. The non-transitory computer readable medium of claim 9, wherein the storage device is a solid state based storage device, and the duration of time is based on a solid state storage architecture used by the solid state based storage device.

12. The non-transitory computer readable medium of claim 11, wherein the solid state storage architecture comprises a component that limits the duration of time that data stored in the storage device while the storage device is depowered is likely to be retrievable after the storage device is repowered after being depowered.

13. The non-transitory computer readable medium of claim 9, wherein the expedited refresh is performed by the storage device using a foreground process that is not deprioritized with respect to host originated storage commands issued to the storage device.

14. The non-transitory computer readable medium of claim 13, wherein the storage device is adapted to perform a continuous refresh process for the data, the continuous refresh process being a background process that is deprioritized with respect to host originated storage commands issued to the storage device.

15. The non-transitory computer readable medium of claim 14, wherein the data is stored in cells of the storage device, the cells being adapted to maintain data stored in the cells indefinitely while the storage devices is powered and maintain the data stored in the cells for a period of time while the storage device is depowered.

16. The non-transitory computer readable medium of claim 15, wherein the expedited refresh and the continuous refresh process migrate the data between the cells, and the period of time being based on a cell architecture of the cells.

17. A data processing system comprising:
   a processor; and
   a memory coupled to the process for storing instructions, the instructions causing operations to be performed when the instructions are executed by the processor, and the operations comprising:
      identifying a period of time when a data processing system will be depowered for a duration of time meeting criteria;
      based on the identified period of time:
         issuing an expedited data refresh command to a storage device of the data processing system prior to the period of time; and
         based on the issued expedited data refresh command, performing, by the storage device, an expedite refresh of data stored in the storage device to obtain an updated storage device prior to the period of time.

18. The data processing system of claim 17, wherein the expedited refresh command indicates that the data stored in the storage device is to be refreshed and the storage device is to shut down once the data is refreshed.

19. The data processing system of claim 17, wherein the storage device is a solid state based storage device, and the duration of time is based on a solid state storage architecture used by the solid state based storage device.

20. The data processing system of claim 19, wherein the solid state storage architecture comprises a component that limits the duration of time that data stored in the storage device while the storage device is depowered is likely to be retrievable after the storage device is repowered after being depowered.

* * * * *